Patented Sept. 27, 1932

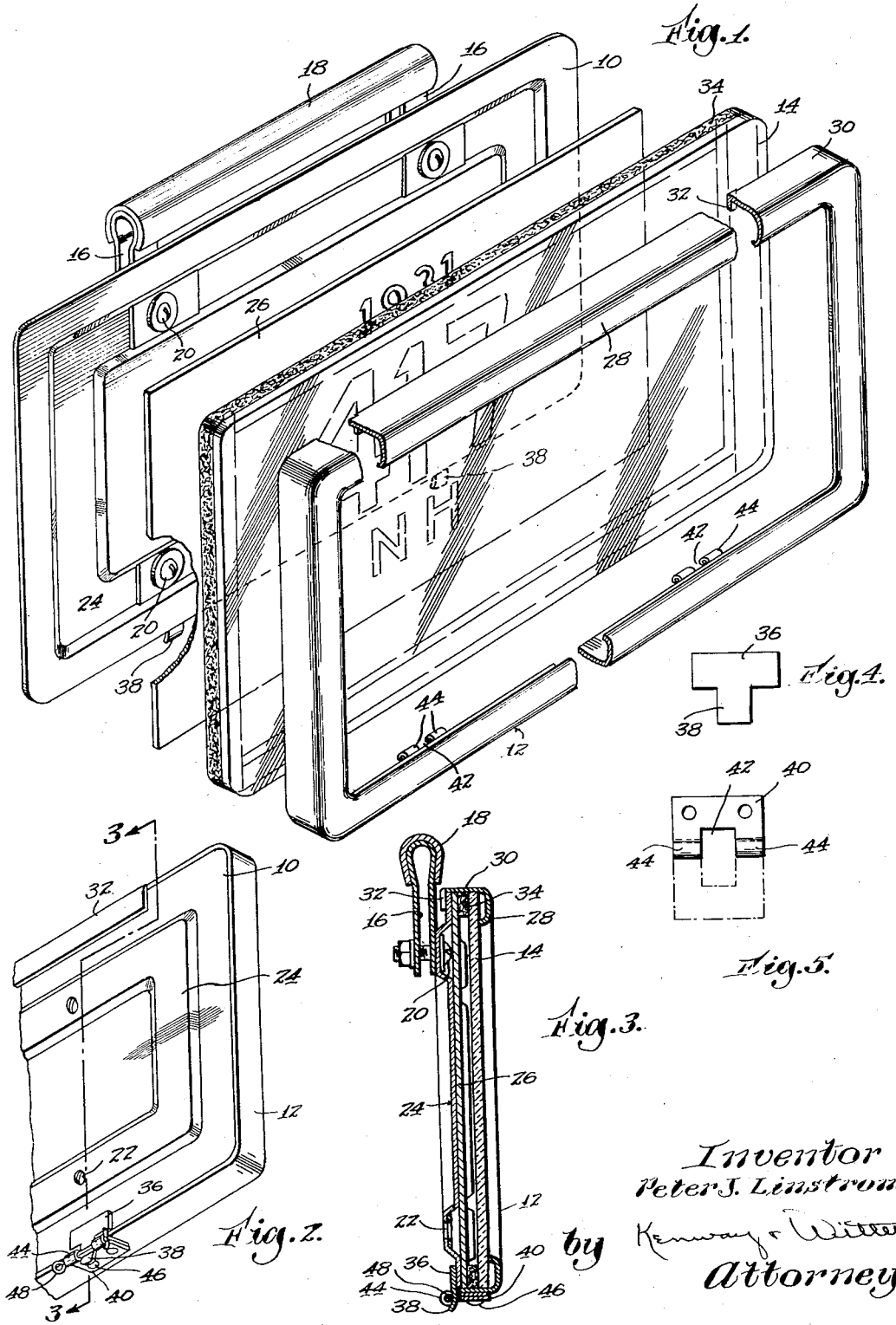

1,879,906

UNITED STATES PATENT OFFICE

PETER J. LINSTROM, OF MEDFORD, MASSACHUSETTS

LICENSE PLATE HOLDER

Application filed September 24, 1931. Serial No. 564,821.

This invention relates to automobile license plate holders of the type shown in my copending application Serial No. 470,620, filed July 25, 1930 and the primary object of the invention is to provide an improved holder which will give a more ornamental finish to the license plate; which will more securely house and protect the plate under glass; which may readily be cleaned; and which will so securely hold the parts in assembled relation as to eliminate rattling and accidental releasing thereof.

License plate holders heretofore known have been generally cumbersome and inartistic in construction and more especially so because of the many projecting fastenings and parts thereof. These objectionable features have been heretofore necessary in order to mount the holders on their supporting brackets and to hold the several parts thereof securely in assembled relation. My invention contemplates an improved license plate holder wherein these objectionable characteristics are substantially eliminated and wherein the fastening means for holding the parts assembled is reduced to a simpler, more convenient and substantial and a more economical form than has been known heretofore.

My improved holder comprises a supporting back plate and an open frame to cooperate therewith in supporting the license plate, preferably behind a protecting glass. The back plate is provided with holes whereby it may be secured to the license plate supporting brackets of standard automobiles and after which the frame with the glass and license plate therein may be fitted over and upon the back plate, the back plate thereby supporting the frame and license plate while entirely housed with the frame. The invention herein resides more especially in an improved and simplified retaining means for securing and holding the parts in this assembled relation and the production of such a compact and pleasing license plate holder embodying this improved retaining means comprises a further object of my invention.

In the accompanying drawing I have illustrated one specific embodiment of my invention but it will be understood that the invention can be otherwise embodied and that the drawing is not to be construed as defining or limiting the scope of the invention, the claim appended hereto being relied upon for that purpose.

Referring to the figures of the drawing,

Fig. 1 is a disassembled perspective view of the parts comprising my invention;

Fig. 2 is a perspective rear view of one end of the assembled device;

Fig. 3 is a cross section taken on line 3—3 of Fig. 2 and showing the device mounted on a supporting bracket;

Fig. 4 is a detail view showing a fastening element; and

Fig. 5 is a detail view showing a cooperating fastening element and the method of making the same.

My improved license plate holder comprises mainly two parts, a back plate 10 and an open frame 12. I also prefer to employ a protecting glass 14. A pair of license plate supporting brackets 16 are illustrated as being adjustably mounted within a bar 18 and I support the back plate on these brackets by bolts 20. For this purpose the back plate may be provided with holes 22 adjacent the ends thereof and a countersunk depression 24 is formed front face of the plate to receive the heads of the bolts. As thus mounted, the back plate 10 is adapted to receive and support the license plate 26 flat against the front face thereof.

The frame 12 is of open construction, U-shaped in cross section, and has a relatively short rearwardly-extending inner portion 28 and a relatively long rearwardly-extending outer portion 30, and an inwardly or downwardly extending ledge 32 is formed on the rear edge of the outer portion at the top side of the frame. The glass 14 is adapted to fit within the frame against the portion 28. In order to fit and hold the parts securely within the frame and keep out dust and moisture, I cement a rubber gasket 34 to the rear portion of the glass adjacent to its periphery and the license plate 26 fits within the portion 30 and rests against this gasket, the gasket acting to space the license plate from the glass and provide a resilient abutment between the glass and frame. In assembling the parts, the glass and license plate are mounted in the frame and the top edges are held therein by the ledge 32. The holder as thus far described is entirely comprised within the frame 12 and one object of my invention herein is to provide a simplified and convenient means for cooperating with the ledge 32 to hold the parts thus assembled in a very substantial manner. This means will now be described.

Permanently secured to the bottom ledge of the back plate, as by spot welding, is a pair of relatively spaced metal pieces 36 each having an ear 38 projecting outwardly or downwardly beyond said edge. Permanently secured to the bottom edge of the frame is a pair of metal pieces 40 each comprising a flat strip having its central portion cut out at 42 as shown in Fig. 5, and folded over onto itself to form two relatively spaced eyes 44. These pieces 40 may be secured to the frame in any convenient manner and I have illustrated the same as riveted at 46. Cooperating with these pieces in holding the parts assembled are cotter pins 48 extending through the eyes 44 as hereinafter described.

The parts are assembled in the following manner. The back plate 10 is first mounted on the brackets 16, it being understood that the position of the holes 22 is such as to permit the back plate to be mounted in the same manner as is the commercial license plate. The frame 12 with the glass 14 and license plate 26 therein is then placed over the back plate, the top edge of the back plate being first inserted behind the ledge 32 and the bottom edge of the back plate being then passed into the frame. In this position the ears 38 extend into the recesses between the eyes 44. Cotter pins 48 are then projected through the eyes and these pins engage the ears 38 and securely hold the back plate in place and the parts in assembled relation. It will be noted that the relation of the pieces 36 and 40 is such that they hold the back plate flush within the frame as shown in Fig. 2.

The fully assembled plate and holder, as shown in Fig. 2, embodies a single and substantial unit, the cotter pins 48 being the only exposed elements which are not substantially integral with either the plate or frame. The assembled holder, therefore, comprises a very substantial and compact body which is fully able to withstand the vibration and shocks of the vehicle without rattling or becoming loose. It will also be appreciated that the bottom portion of the back plate is so resiliently forced into the frame and held therein against the gasket 34 and the inner portion 28 of the frame by the cotter pins that no vibration between the frame and back plate is permitted. The construction is not only very compact and substantial, but also extremely economical since the pieces 36, 40 and 48 are very nominal in cost and in their application to the holder.

Having thus described my invention, what I claim as new and desire to secure by Letters Patent of the United States is:—

A license plate holder comprising a back plate having openings therethrough adapted to receive means for mounting the same at the rear side thereof, a one-piece open frame continuously U-shaped in cross section and having a relatively short rearwardly-extending inner portion and a relatively long rearwardly-extending outer portion, a glass within the frame and resting against said inner portion, a resilient gasket on the rear surface of the glass adjacent to its periphery and outside of said inner portion, the gasket being adapted to be engaged by a license plate in a manner spacing the plate from the glass and the back plate being adapted to engage against the license plate within said outer portion, an inwardly-extending ledge along the rear edge of one side of the frame for holding the parts within the frame, two relatively spaced metal pieces permanently secured to another side of the frame and each having a pair of relatively spaced eyes projecting rearwardly beyond the edge of the frame, two relatively spaced metal pieces permanently secured to the rear face of and adjacent to the corresponding edge of the back plate and each having an ear projecting outwardly beyond said edge and between two of said eyes, and pins extending through the eyes and over the ears in a manner cooperating with said ledge to hold the back plate within the frame.

PETER J. LINSTROM.